United States Patent

[15] 3,636,449

Partridge

[45] Jan. 18, 1972

[54] POSITION SENSOR
[72] Inventor: Leslie W. Partridge, Janesville, Wis.
[73] Assignee: The Burdick Corporation, Milton, Wis.
[22] Filed: Feb. 12, 1970
[21] Appl. No.: 10,800

[52] U.S. Cl. ................................................324/157, 340/266
[51] Int. Cl. ..........................................................G01r 15/10
[58] Field of Search.................................324/157; 340/266

[56] References Cited

UNITED STATES PATENTS 625,597  5/1899  Phillips et al. ..........................324/157

OTHER PUBLICATIONS

Electrical Engineering, Jan. 1943, page 40.

*Primary Examiner*—Alfred E. Smith
*Attorney*—Mason, Kolehmainen, Rathburn & Wyss

[57] ABSTRACT

A circuit for sensing the position of a movable element such as a galvanometer pointer, recording stylus or the like includes a distributed electrical impedance to which the movable element is capacitively coupled. An oscillating signal is coupled across a gap between the movable element and the impedance, and is detected by rectification in order to provide an output signal indicating the position of the movable element. The oscillating signal is chosen so that the output signal can be utilized directly as a DC position signal.

9 Claims, 4 Drawing Figures

PATENTED JAN 18 1972 3,636,449

INVENTOR:
LESLIE W. PARTRIDGE
By Mason, Kolehmainen,
Rathburn & Wyss
Attorneys

POSITION SENSOR

The present invention relates to improvements in circuits for sensing the position of a movable element such as, for example, a galvanometer driven element.

In many situations it is desirable to provide an indication of the position of a movable element. By way of example, it may be desired to provide an electrical signal corresponding to the position of a galvanometer pointer, thus to permit a remote indication of a meter reading or the like. Similarly, it may be desired to provide a signal indicating the position of a galvanometer motor-driven recording stylus of a chart recorder for use in a feedback galvanometer motor drive system.

One method of obtaining such a position signal is to utilize a distributed electrical impedance mounted in a fixed position relative to the movable element and to which the movable element is coupled. In the widely used slide wire type system, the movable element is in sliding electrical contact with a resistance wire. Such arrangements are subject to the disadvantages of contact interference and frictional drag. Potentiometer systems using electromagnetic and capacitive coupling have also been used, but heretofore these systems have been complex, inaccurate, and otherwise unsatisfactory.

Among the important objects of the present invention are to provide an improved position-sensing system; to provide an improved system wherein a movable element is capacitively coupled to a distributed electrical impedance; and to provide a system which is simple and reliable, which does not interfere with the movement of the movable element and which produces a conveniently used DC output signal without the necessity for demodulation.

In brief, in accordance with the present invention there is provided an improved circuit for sensing the position of a movable element relative to a distributed resistance to which the movable element is capacitively coupled. An oscillating signal source has one side coupled to the movable element and a second side coupled by way of rectifier means to the distributed resistance. The oscillating signal is coupled capacitively across a fixed gap between the movable element and the resistance, and is detected by the rectifier means. An output signal is produced which signal is determined in accordance with the position of the movable element. In order to provide a conveniently used DC output signal, filtering is provided, either inherently by the capacitance of the circuit or by a filtering circuit or device.

The present invention together with the above and other objects and advantages thereof may be better understood with reference to the illustrative embodiments of the invention shown in the accompanying drawing, wherein.

Figure 1:
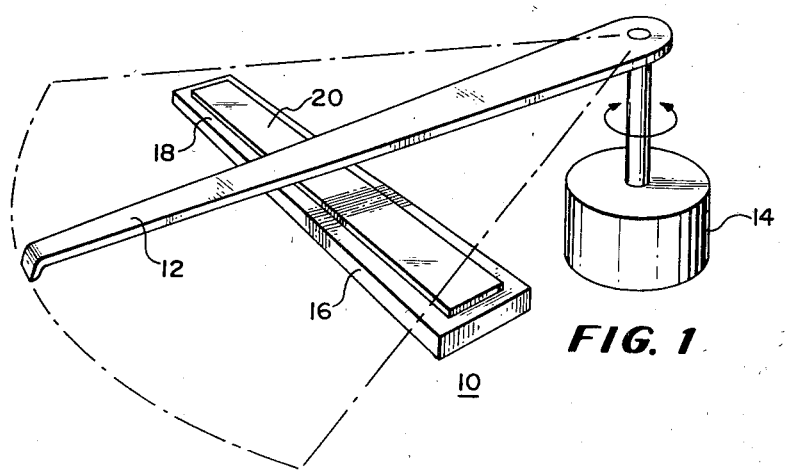
FIG. 1 is a diagrammatic illustration of a galvanometer system in accordance with the invention.

Having reference now to the drawing and initially to FIG. 1 there is illustrated a galvanometer system designated as a whole by the reference numeral 10 and including a movable element 12. In the illustrated arrangement, the movable element 12 comprises a pointer movable to different positions by means of a galvanometer motor 14. It should be understood however that the principles of the present invention are applicable to movable elements other than the illustrated pointer 12, including but not limited to galvanometer-driven inking styli, heated styli and the like.

In order to provide structure for developing an indication of position in conjunction with the position-sensing circuit of the present invention, there is provided a suitable fixed support or body 16 mounted spaced from and beneath the movable element 12. The body 16 defines an upper surface 18 parallel to and facing the plane of movement of the pointer 12. Supported upon the surface 18 is a linear distributed electrical resistance 20, which resistance interfaces and is spaced from the underside of the pointer 12 by a distance which is the same regardless of the position of the movable element 12. The pointer 12 is either entirely or partly formed of electrically conductive material, and capacitive coupling takes place across the gap between the pointer 12 and the resistance 20. The region of the linear resistance 20 to which the pointer 12 is coupled depends upon the position of the movable pointer with respect to the fixed resistance 20.

Figure 2:
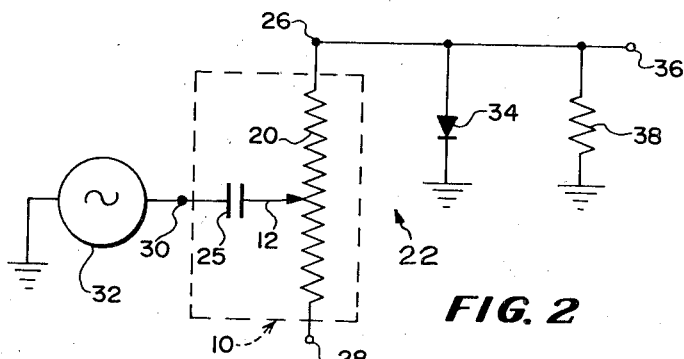
FIG. 2 is a schematic illustration of a position-sensing circuit constructed in accordance with the principles of the invention.
Figure 3:
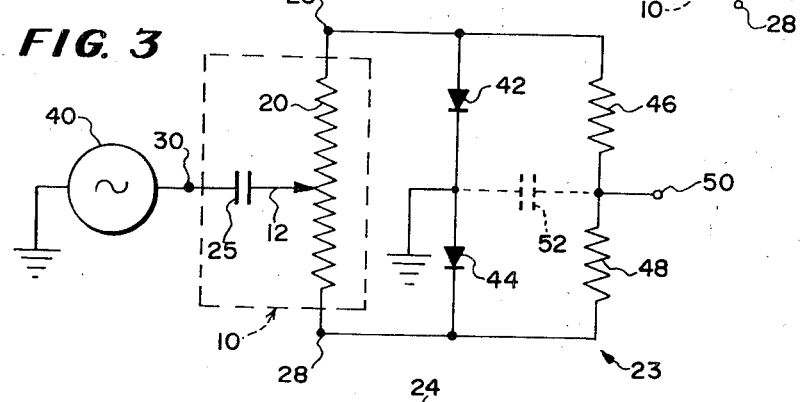
FIG. 3 is a schematic illustration of an alternative embodiment of the invention.
Figure 4:
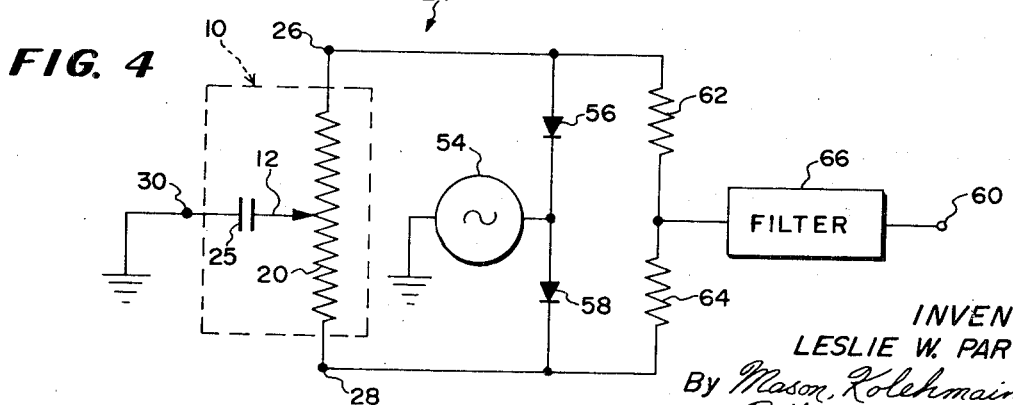
FIG. 4 is a schematic illustration of yet another alternative embodiment of the invention.

Having reference now to FIGS. 2, 3 and 4 there are illustrated position-sensing circuits designated as a whole by the reference numerals 22, 23 and 24 respectively and constructed in accordance with the principles of the present invention. Incorporated into each of the schematic diagrams of FIGS. 2, 3 and 4 is a schematic diagram enclosed within broken lines and representing the electrical equivalent of the galvanometer system 10 of FIG. 1. In the equivalent diagrams, the pointer 12 is illustrated as a movable tap in electrical contact with the resistance 20, and the capacitive coupling between the movable element 12 and resistance 20 is indicated by means of a fixed value capacitor 25. Also shown schematically are terminals 26, 28 and 30 indicating electrical connections made in any suitable manner to opposite ends of the resistance 20 and to the movable element 12 respectively.

In accordance with an important feature of the present invention, an oscillating signal of fixed magnitude is capacitively coupled between the movable element 12 and a portion of the distributed resistance 20. This signal is attenuated by the resistance of the resistance 20 to a degree determined by the position of the pointer 12. The attenuated oscillating signal is then detected to provide a signal having an average value corresponding to the pointer position. Filtering of the signal produces a DC signal usable directly in an indicating or controlling operation.

Referring now more specifically to FIG. 2, the position-sensing circuit 22 comprises a halfwave circuit providing an output signal indicating the position of the pointer 12 relative to the resistance 20. In the arrangement of FIG. 2, there is provided a signal source designated by the reference numeral 32 providing oscillating signals of fixed magnitude. Although illustrated only schematically, the signal source 32 could comprise any suitable oscillator or the like.

In order to couple the oscillating signal across the gap between the pointer 12 and the resistance 20, one side of the signal source 32 is coupled to the movable element 12, this connection being illustrated schematically in FIG. 2 by connection of the source 32 with the terminal 30. The opposite side of the source 32 is coupled through ground to the resistance 20, and specifically to the terminal 26, by way of rectifier means in the form of a diode rectifier 34. It can be seen that there exists effectively a series circuit including the source 32, terminal 30, movable element 12, the capacitive coupling between element 12 and resistor 20 indicated schematically by capacitor 25, and part of the resistance 20. The oscillating signal provided by source 32 is attenuated in this series circuit due to the presence of part of the resistance 20, and the degree of attenuation depends upon the magnitude of the resistance, which in turn depends upon the position of the element 12. The attenuated oscillating signal is detected by the rectifier 34 which bypasses or grounds alternate half cycles of the oscillating signal.

Connected between the terminal 26 and the diode 34 is an output circuit including an output terminal 36 and a resistor 38 for developing an output signal indicative of the position of the movable element 12 relative to the resistor 20. The resistor 38 functions to provide a path for the flow of current through the signal source 32 and the above-described series circuit during half cycles in which the rectifier 34 is nonconductive.

In operation of the position-sensing circuit 22 of FIG. 2, the average value of the output signal appearing at the output terminal 36 becomes more negative as the pointer 12 moves from a lower position to an upper position relative to the resistor 20 as illustrated in FIG. 2. More specifically, the signal coupled between the movable element 12 and the resistor 20 is bypassed to ground by the rectifier 34 during positive half cycles of the oscillating signal provided by the source 32. During negative half cycles, the signal is applied across the resistor 38 in series with the portion of the resistor 20 included in the circuit, these two resistances acting in the nature of a voltage divider of which the output terminal 36 is a tap. If a small segment of the resistor 20 is included in the circuit, the average voltage appearing at the output terminal 36 is a relatively large negative voltage. Conversely, if a large segment of the resistor 20 is included in the circuit, the output signal appearing at the terminal 36 is relatively less negative. In this manner, there is provided at the output terminal 36 relative to ground a voltage having an average value that varies in accordance with the position of the movable element 12.

Having reference now to FIG. 3, there is illustrated the circuit 23 comprising an alternative embodiment of the invention wherein there is provided a full-wave detection circuit for producing a balanced and more powerful output signal. In the arrangement of FIG. 3, there is provided an oscillating signal source 40 having one side coupled to the terminal 30,—i.e., to the movable element 12, and having its other side coupled to the resistance 20 by way of ground and rectifier means in the form of two diode rectifiers 42 and 44. More specifically, the second side of the signal source 40 is grounded, while rectifier 42 has its anode connected to the terminal 26 and its cathode connected to ground. Conversely, the rectifier 44 has its cathode connected to the terminal 28 and its anode grounded. An output circuit including a pair of equal valve resistors 46 and 48 and an output terminal 50 is coupled to the points of interconnection of the rectifiers 42 and 44 with the resistance 20 and serves to provide an output signal having an average value determined by the position of the movable element 12.

The operation of the position-sensing circuit 23 is quite similar to the operation of circuit 22 described above, except that full-wave attenuation and detection is provided. Oscillating signals of fixed value are coupled from the movable element 12 to a point on the resistor 20 determined by the position of the movable element 12 relative thereto. Current flowing through the resistor 20 divides into two branches, one of which flows through the terminal 26 and one of which flows through the terminal 28. The diodes 42 and 44 are oppositely poled with respect to ground thus serve to bypass signals of opposite polarity directly to ground. During positive half cycles, one branch current is shunted directly to ground by the diode 42 while the other branch current flows through a voltage divider circuit made up of the lower segment of the resistor 20 and the resistors 48 and 46 to the diode 42 and ground. During negative half cycles, the diode 44 bypasses one branch current to ground while the other flows through the upper segment of the resistor 20, and the resistors 46 and 48 to the rectifier 44. The voltage at the output terminal 50 becomes relatively negative as the movable element 12 moves in the illustrated upward direction relative to the resistor 20 and becomes relatively positive as the movable element 12 moves in the illustrated downward direction with respect to the resistance 20.

In accordance with one feature of the invention, there is provided at the output terminal 50 a signal which can be utilized directly as a DC signal. In the arrangement of FIG. 3, the distributed inherent capacity of the circuit with respect to ground is indicated by means of a capacitor 52 shown in broken lines. The frequency of oscillation of the signal source 40 is selected in reference to the value of this capacitance so that the output signal is smoothed or filtered and appears at terminal 50 as substantially a DC signal. Preferably an RF signal is used. For example, in a device constructed in accordance with the present invention, the signal source had a frequency of operation of approximately 2 megahertz, and the output signal appearing at the output terminal was substantially a DC signal. This arrangement has the advantage that the signal can be used directly and without external filtering to carry out a control function, an indicating function or the like. It should be understood that similar internal filtering can be achieved in the circuits of FIGS. 2 and 4 as well.

With reference to FIG. 4, it can be seen that the novel circuit of the present invention can also be applied in situations where it is desired to ground the movable element 12 rather than connecting it directly to the nongrounded side of the signal source. In the circuit 24 the terminal 30 representing the connection to the movable element 12 is coupled directly to ground. Conversely, a source of oscillating signals designated by the reference numeral 54 is coupled to opposite sides of the resistance 20 by a pair of oppositely poled diode rectifiers 56 and 58. The terminals 26 and 28 are also coupled to an output terminal 60 by a pair of resistors 62 and 64.

Except for the point at which the series circuit loops including the movable element 12, portions of the resistor 20, the rectifiers 56 and 58 and the signal source 54 are connected to ground, the circuits of FIG. 3 and FIG. 4 are substantially equivalent. In FIG. 4 there is schematically illustrated in block form a filter 66 which may be used to produce a DC output signal in the event that the distributed capacity in the circuit 24 is insufficient to smooth or filter the output signal to the desired extent. The filter 66 may comprise a resistance-capacitance filter circuit. Conversely, the filter 66 can comprise a device such as an audiofrequency transistor amplifier having a speed of operation substantially less than the oscillation frequency of the source 54.

Although the present invention has been described with reference to specific embodiments thereof, it should be understood that various modifications and alterations may be made without departing from the scope of the invention as defined in the following claims.

What is claimed and desired to be secured by Letters Patent of the United States is:

1. A position-sensing circuit for use with a movable element having at least a conductive portion and comprising in combination:

an elongated distributed resistance having a surface parallel to and facing the plane of movement of said conductive portion and providing a capacitive coupling thereto having a constant capacitive impedance;

a signal oscillator producing a balanced substantially constant oscillating signal and having first and second output terminals;

said first output terminal being coupled to said conductive portion;

diode rectifier means coupled between said second output terminal and said distributed resistance;

and means connected across said rectifier means for developing a position signal, said signal developing means including filtering means capable of providing a substantially DC output.

2. The circuit of claim 1, said rectifier means comprising first and second rectifiers oppositely poled with respect to said second output terminal and each coupled between said second output terminal and one end of the distributed resistance.

3. The circuit of claim 2, said position signal developing means including resistance means connected across the ends of said distributed resistance.

4. The circuit of claim 3 said resistance means comprising first and second resistances connected in series, and an output terminal coupled to the point between said first and second resistances.

5. The circuit of claim 1, said oscillating signal being an RF signal.

6. A position-sensing circuit for sensing the position of a galvanometer-driven movable element, said circuit comprising a source of RF oscillating signals, said source having two output terminals, a distributed resistance disposed along and spaced from the path of movement of the movable element and being constructed and arranged so that said element is capacitively coupled by a uniform capacitive impedance to a region on said resistance dependent on the position of said element, one of said signal source output terminals being connected to said movable element, a first diode rectifier having an anode connected to one end of said distributed resistance and a cathode connected to the other said signal source output terminal, a second diode rectifier having a cathode connected the other end of said distributed resistance and an anode connected to said other signal source output terminal, a pair of resistors connected in series with one another across the ends of said distributed resistance, an output signal terminal coupled to the junction of said two resistors, and filter capacitor means coupled to said output signal terminal, said filter capacitor means having a value in relation to the frequency of oscillation of said source such that a substantially DC signal appears at said output signal terminal.

7. The circuit of claim 6, said filter capacitor means comprising inherent distributed capacitance of said circuit.

8. The circuit of claim 6, ground reference potential being connected to said one signal source output terminal.

9. The circuit of claim 6, ground reference potential being connected to said other signal source output terminal.

* * * * *